(12) United States Patent
Ward et al.

(10) Patent No.: US 7,347,379 B2
(45) Date of Patent: Mar. 25, 2008

(54) DUAL ANTENNA COIL TRANSPONDER SYSTEM

(75) Inventors: William H. Ward, Costa Mesa, CA (US); Timothy Jon Ward, Mira Loma, CA (US)

(73) Assignee: Avid Identification Systems, Inc., Norco, CA (US)

( * ) Notice: Subject to any disclaimer, the term of this patent is extended or adjusted under 35 U.S.C. 154(b) by 351 days.

(21) Appl. No.: 10/499,351

(22) PCT Filed: Nov. 1, 2002

(86) PCT No.: PCT/US02/35167

§ 371 (c)(1),
(2), (4) Date: Nov. 19, 2004

(87) PCT Pub. No.: WO03/040950

PCT Pub. Date: May 15, 2003

(65) Prior Publication Data

US 2005/0087599 A1 Apr. 28, 2005

(51) Int. Cl.
*G06K 19/06* (2006.01)
*G08B 26/00* (2006.01)
*H04Q 5/22* (2006.01)

(52) U.S. Cl. ............... 235/492; 340/505; 340/10.1; 340/572.1

(58) Field of Classification Search ............... 235/492; 455/78, 41.1, 82, 101; 340/505, 10.1, 572.1
See application file for complete search history.

(56) References Cited

U.S. PATENT DOCUMENTS

| | | | |
|---|---|---|---|
| 4,361,153 A | 11/1982 | Slocum et al. | |
| 4,500,883 A | 2/1985 | Gutlber | |
| 4,542,532 A | 9/1985 | McQuilkin | |
| 4,673,943 A | 6/1987 | Hannan | |
| 5,227,803 A | 7/1993 | O'Connor | |
| 5,264,798 A | 11/1993 | Bey, Jr. et al. | |
| 5,455,575 A | 10/1995 | Schuermann | |
| 5,491,715 A * | 2/1996 | Flaxl | 375/344 |
| 6,023,610 A * | 2/2000 | Wood, Jr. | 455/101 |
| 6,236,315 B1 | 5/2001 | Helms et al. | |
| 6,307,468 B1 | 10/2001 | Ward, Jr. | |
| 6,483,427 B1 | 11/2002 | Werb | |

\* cited by examiner

*Primary Examiner*—Daniel Hess
(74) *Attorney, Agent, or Firm*—DLA Piper US LLP

(57) ABSTRACT

The present invention relates to a dual antenna coil identification system, and more particularly, to an interrogator or reader for inductively coupling to a transponder and thereby extract data from the transponder. The magnetic field required to energize a transponder is generated by currents flowing through two essentially identical but opposite phased antenna coils arranged near the area where tags are to be read.

55 Claims, 7 Drawing Sheets

DUAL ANTENNA COIL TRANSPONDER SYSTEM

BACKGROUND OF THE INVENTION

1. Field of the Invention

The present invention relates to a radio frequency identification (RFID) system, and more particularly, to an improved dual antenna coil antenna and signal processing RFID interrogator or reader for inductively coupling to a transponder to extract data from the transponder. A magnetic field emitted by the reader to energize the transponder is generated by currents flowing through two essentially identical but spaced apart antenna coils.

2. Related Art

In the automatic data identification industry the use of cooperative identification systems which may include an interrogator (also known as a reader) and a transponder (also known as a tag), has grown in prominence as a way to track objects and/or data regarding an object to which the transponder is affixed. A transponder generally includes a semiconductor memory, in which digital information may be stored. Using a technique known as inductive coupling, a transponder provides the stored data to an interrogator in response to an electromagnetic field that is generated by the interrogator. This type of inductively coupled identification system is very versatile. The transponders may be passive, in which they extract their power from the electromagnetic field provided by the interrogator, or active, in which they include their own power source. The passive transponders can be either "half-duplex" or full-duplex" transponders, which can be manufactured in very small, lightweight, and inexpensive units. The interrogator-transponder systems can be made to operate in a wide range of frequencies, from kilohertz to gigahertz. The interrogator may be portable and powered by a small battery, or fixed and powered by a battery or AC power.

In view of these advantages, inductively coupled identification systems are used in many types of applications in which it is desirable to track information regarding a moving or inaccessible object. Various applications may include asset and inventory control, access control, security, and transportation applications such as vehicle toll collection, parking, and fleet management. Another application is to affix transponders to animals in order to provide information such as their health, behavior, or location. One method of attaching the transponder is to implant the transponder within the animal. For example, the transponder may be implanted beneath the skin of the animal or the transponder may be designed such that, when swallowed, it remains in the stomach or digestive tract of the animal. Passive transponders are uniquely suited for this type of application because they do not require an internal power source such as a battery that can wear out.

The inductively coupled identification system may utilize an interrogator that generates through an antenna coil an electromagnetic field for inductively coupling to a transponder. The transponder may be passive and have a memory device coupled to an inductive antenna coil that serves both as the antenna and inductive power supply to draw power from a generated electromagnetic field to supply power to the transponder's electrical circuits. One method of providing data to the interrogator is for the transponder to retransmit the identification data to the interrogator. This approach requires the use of transmission and reception circuitry in both the interrogator and the transponder. Alternatively, because it is desirable to miniaturize the transponder, it is beneficial to eliminate as many parts in the transponder as possible. Thus, another method of providing the data to the interrogator is to provide a variable load within the transponder. To decode the data, the interrogator measures the power output of the interrogator and loading by the transponder. The modulated power signal is decoded to separate the data element for later digital interpretation.

A drawback of conventional inductively coupled identification systems is that the inductive coupling between the transponder's inductive antenna coil and the electromagnetic field, generated by the interrogator's field antenna coil, may depend on the relative distance between the interrogator's field antenna coil and the transponder's inductive antenna coil. If the distance between the interrogator's field antenna coil and the transponder's inductive antenna coil are minimized, then inductive coupling is maximized. However, if the distance is relatively far then inductive coupling is negligible and the inductive coupling is less effective. Accordingly, it would be desirable to provide an interrogator which increases the effective range for reading the transponder.

In Conventional inductively coupled identification systems the interrogator is unable or not designed to pick up disturbances in the magnetic field caused by conductive objects other than transponder tags. For example, an animal or human walking near the antenna coils may magnetically react to the magnetic field produced by the interrogator. However, conventional RFID systems lack the sensitivity and/or circuitry to detect any magnetic disturbances. Accordingly, it would be desirable to provide an interrogator which can detect conductive objects other than transponder tags.

SUMMARY

The present invention provides an interrogator having two antenna coils which are placed so that a transponder tag can be read when placed near them. The interrogator also is able to detect a conductive object other than a transponder tag. In one embodiment, each antenna coil is driven to produce an identical and preferably oppositely phased magnetic field. A device, such as a transformer in the circuit measures any differences in the current between the antenna coils. The magnetic field required to energize a transponder and/or detect a conductive object is generated by currents flowing through antennas, for example as discussed herein antenna coils of varying configurations, arranged near the area where the tags are to be read or an object is to be detected. The antenna coils are preferably identical and oppositely phased, however, it is within the scope of the present invention to use different antennas and/or antenna coils which are not oppositely phased.

When a transponder is placed next to the two antenna coils and activated, a change is induced in the magnetic field(s) of the antenna coil(s). This change induces a time varying differential current measured between the two antenna coils which is reflective of the data stored in the transponder. The differential current is read, filtered, and decoded. In one embodiment of the present invention, an auto-tuning circuit is provided which tunes the antenna-antenna coil driver signals to resonance. An auto-nulling circuit is also provided which nulls any differential currents induced by phenomina other than objects such as transponder tags or conductive objects.

Other systems, methods, features and advantages of the invention will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
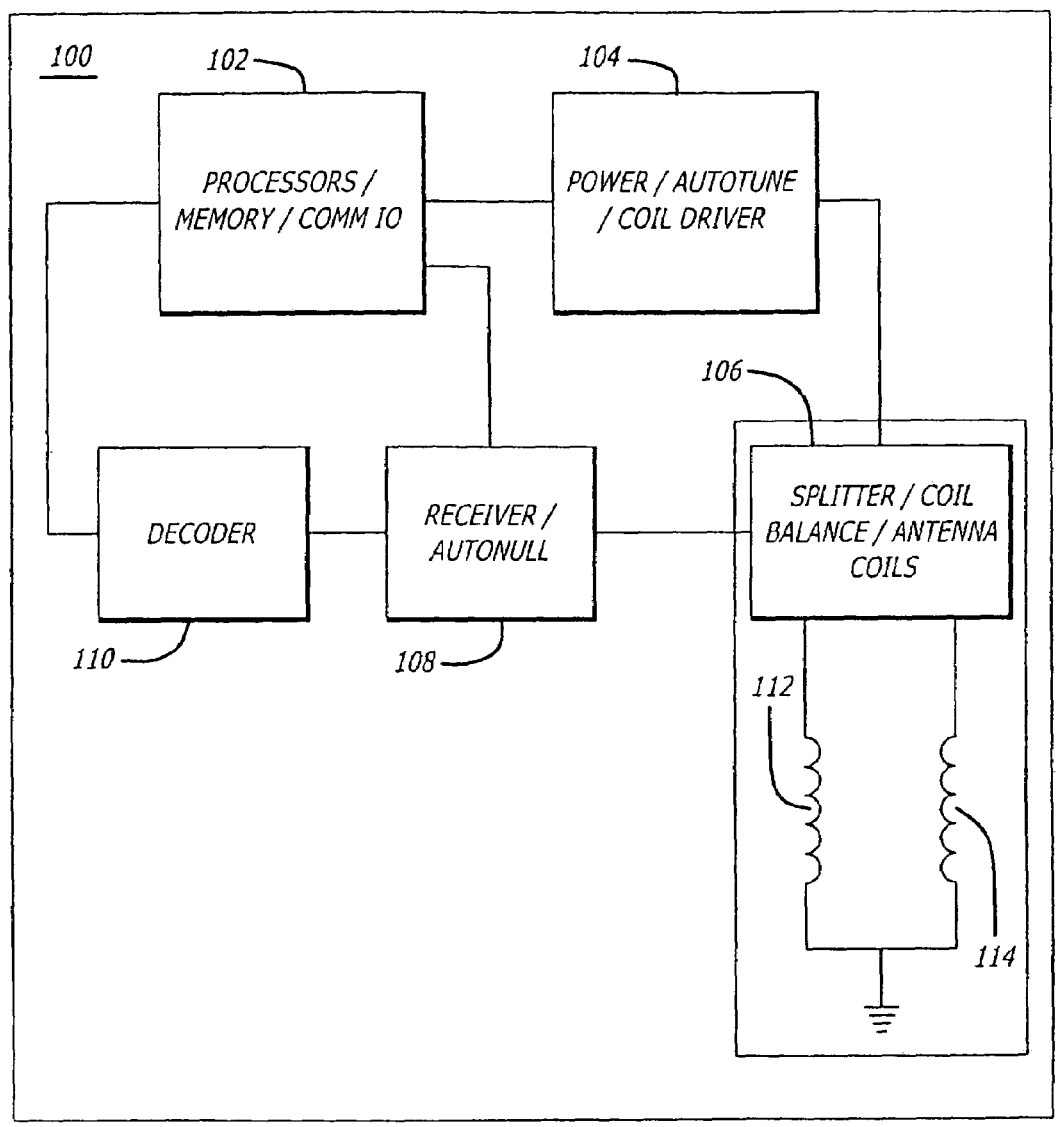
FIG. 1 depicts the basic components of the dual antenna coil reader of the present invention.

FIG. 1 depicts the basic components of the RFID interrogator of the present invention. The entire interrogator 100 may be constructed out of analog electrical components, digital electrical components, or a combination thereof. Accordingly, most of the main electrical components of the interrogator 100 may be constructed on a single IC chip, a PC board, or any appropriate circuit board and/or assembly known to one skilled in the art. The system also includes two antenna coils 112 and 114 which are placed so that a transponder tag can be read when placed in the field generated by the antenna coils 112 and 114. The carrier signals which drive the antenna coils 112, 114 are generated by processor(s) 102 and are fed into antenna coil-driver/power circuitry 104 to generate an antenna coil-driver signal. The antenna coil-driver/power circuitry 104 contains an impedance matching network which allows the impedance of the circuit to be matched to the antenna coils 112, 114. Furthermore, the antenna coil-driver/power circuitry 104 contains an auto-tuning network (described below) which allows the circuit to be automatically tuned to the desired resonance.

A splitter 106 receives the antenna coil-driver signal from the antenna coil-driver/power circuitry 104 and splits the current equally to the antenna coils 112, 114. When a transponder is placed in the field generated in the vicinity of the two antenna coils 112, 114 and activated by the signals from the antenna coils 112, 114, a measurable change is induced in the magnetic fields produced by the antenna coils 112, 114. This change induces a differential current which can be measured between the two antenna coils 112, 114 which is reflective of either the data contained in a half duplex or full duplex transponder and/or indicative of a conductive object passing through or alongside the magnetic fields produced by the antenna coils 112, 114.

The present invention allows objects such as animals or humans and/or any other objects which are conductive to be detected. For example, if an animal such as a cow passes between or alongside the antenna coils, the presence of the cow will generate a reaction in the field(s) generated by the antenna coils 112, 114 and cause a measurable disturbance in the magnetic field(s). This disturbance will induce a differential current between the two antenna coils 112, 114 which a reader communicatively coupled to the splitter 106 is able to detect. This feature may be used to track animals, humans, and/or other objects which initiate the magnetic reaction. The feature may also be used to indicate that a conductive object has passed through the antenna coils without having a transponder tag. The means for indicating the detection of a conductive object may be any type of output such as a siren, horn, light, or any other output mechanism known to one skilled in the art.

The present embodiment includes an antenna coil balance circuit within the splitter 106 which allows matching of the impedance of both antenna coils 112, 114 prior to or during operation. This may be accomplished, for example, by the use of an adjustable differential inductor and/or adjustable resistor(s) within the splitter 106.

The RFID interrogator 100 includes receiver circuitry 108 which is coupled to the splitter 106. The receiver circuitry 108 receives the difference signals generated by a half duplex or full duplex transponder and/or a conductive object near or within the magnetic field of the antenna coils 112, 114. The RFID interrogator 100 also includes and decoder circuitry 110 coupled to the receiver circuitry 108 which decodes the signal. Auto-nulling circuitry may also be provided in the receiver 108 which continuously (between transponder readings) nulls any offset between the signals driving the antenna coils 112, 114.

Figure 2:
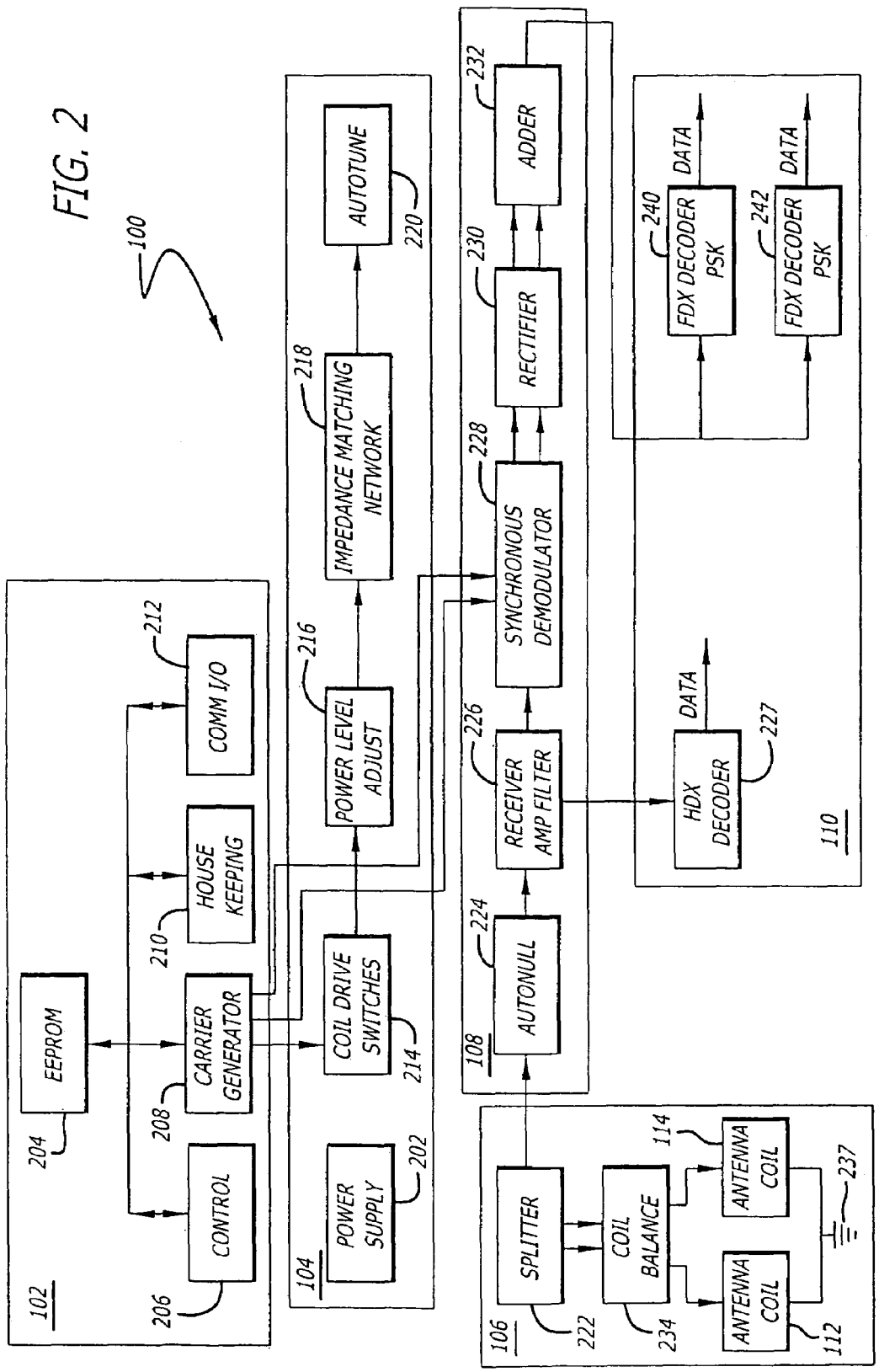
FIG. 2 is an exemplary block diagram of the reader circuit of FIG. 1.

FIG. 2 is an exemplary block diagram of the interrogator 100 of FIG. 1. It should be noted that many circuit and component variations are contemplated and that their incorporation would not depart from the scope of the present invention. Accordingly, the interrogator 100' represents one exemplary embodiment of the interrogator 100 shown in FIG. 1. The corresponding circuit blocks to components 102, 104, 106, 108; 110, 112, 114 of FIG. 1 are indicated in more detail in FIG. 2. The interrogator 100 operates on a DC power source 202 derived from either an AC line powered DC supply or alternatively a storage battery. The DC power is further divided into various voltage levels by regulators (not shown).

As noted the processor(s))102 includes Electrically Erasable Programmable Read Only Memory (EEPROM) 204 as well as a control processor 206, a carrier generator 208, a housekeeping processor 210 and a communication input/output ("COMM I/O") processor 212. Each of these components is electrically interconnected to share data and instructions within the processor(s) 102.

The antenna coil driver/power circuitry 104 includes, in addition to the power supply 202, coil driver switches 214, a power level adjust 216, an impedance matching network 218 and an auto-tune 220. These components are interconnected as discussed below for receiving an input from the carrier generator 208 to the coil drive switches 214 and outputting a coil driver signal to the splitter 106.

The splitter 106 includes a signal splitter 222 which receives the coil driver signal from the antenna coil driver/power circuitry 104. The splitter 106 may include a coil balance circuit 234, as shown in FIG. 2, positioned between the splitter 222 and the antenna coils 112 and 114. The antenna coils 112 and 114 may include a common output to a ground 237.

The splitter 106 not only drives the antenna coils 112 and 114, it outputs signals from the antenna coils 112 and 114 to the receiver circuitry 108. The receiver circuitry 108 includes an autonull 224 which receives the signals from the splitter 106, and forwards the signals, after autonull processing, to a receiver amp filter 226. The receiver amp filter outputs signals to a synchronous demodulator 228, which also receives input signals from the carrier generator 208 of the processor(s) 102. The synchronous demodulator 228 provides output signals to a rectifier 230 which in turn forwards the signals to an adder 232. The receiver circuitry 108 outputs signals from the receiver amp filter 226 and the adder 232 to the decoder circuitry 110.

The decoder circuitry 110 includes a half duplex ("HDX") decoder 227, for receiving signals from the receiver amp filter 226 as well as full duplex ("FDX") decoders 240 and 242 which receive signals from adder 232 to provide decoding of Phase Shift Keyed ("PSK") signals by FDX decoder 240 or Frequency Shift Keyed ("FSK") signals by FDX decoder 242, respectively, DATA out descriptive.

The processor(s) 102 includes control microprocessor 206 which is used for master control of the interrogator 100 to provide control signals for timing, communication, etc. The time base for this control microprocessor 206 is used to generate a synchronization signal. The synchronization signal generated by the control microprocessor 206 is divided down to the carrier frequency, 134.2 KHz for example, by a second carrier generator microprocessor 208 which generates several signals at divided down frequencies. For example, the carrier generator microprocessor 208 may be coupled to the antenna coil-driver, power circuitry 104' to provide carrier signals generated to turn the antenna coil drive switches 214 on and off at the appropriate time to generate minimum harmonics in an antenna coil drive signal produced by the antenna coil-driver/power circuitry 104.

The carrier generator microprocessor 208 may also be coupled to the receiver circuitry 108 to provide carrier signals, also generated at the peaks and zero crossings of the antenna coil drive signal, for the synchronous demodulator 228 of the receiver circuitry and for other timing purposes.

The antenna coil drive switches 214 connect the antenna coil impedance matching network in sequence to the DC supply voltage, then open the circuit, then ground the circuit, then open the circuit again, then reconnect back to the DC supply voltage. The periods of open circuit result in a significant reduction in generated harmonics of the carrier in the antenna coil drive signal. During these periods of open circuit, the inductive current from the antenna coil flows through diodes (not shown) to ground or to the DC supply as required. The antenna coil drive switches 214 feed current into a power level adjust 216 and then into an impedance matching network 218 consisting of the series drive capacitor, the antenna coils, and the parallel tank capacitors. The antenna coil impedance is relatively low, to keep the peak voltages to convenient values. The impedance matching network raises the impedance seen by the antenna coil drive switches 214 and lowers the current switch to a convenient value. Smaller values of the series drive capacitor raise the impedance seen by the antenna coil drive switches 214, thus reducing the peak voltage and power circulating in the antenna coils. Since the series drive capacitor is part of the resonant circuit, changes in its capacitance must be also reflected in the parallel resonant circuit capacities. By switching portions of the series drive capacitor between ground and the switches, the overall resonant frequency remains unchanged. Thus the power to the antenna coils may be conveniently adjusted without readjustment of the tuning.

The inductance of the antenna coils may vary with their position and environment, which requires retuning to resonance from time to time. The auto-tune circuit 220 automatically retunes the circuit by switching trim capacitors in or out as required. A phase detector (not shown) compares the antenna coil signal to the digital drive signal, generating a phase error signal indicating the direction and amount of correction needed for resonance. That error signal is sent to the housekeeping microprocessor 210 which computes the correct combination of trim capacitors to retune to resonance and sets the switches accordingly. This switch update occurs only during the period while the antenna coil power is off, not while a full-duplex transponder tag is being read.

The antenna coil drive signal proceeds from the impedance matching 218 and autotune circuits 220 to a power splitter circuit 222. The power splitter circuit 222 splits the current into the two matched antenna coils 112 and 114 and subtracts the two currents to form a difference current. A device such as a differential transformer may be used to extract the difference current. If there is no tag modulating the magnetic field, the currents directed to each antenna coil will be equal and thus there will be no difference current. If there is a tag near the field and/or a conductive object is placed near the field, there will be a difference between the currents driving the two antenna coils. This difference will appear as a signal on the difference current measuring device. For example, if a differential transformer is utilized, the difference current will appear as a voltage on a third winding on the differential transformer. The first and second windings of the differential transformer are connected to each antenna coil. This differential signal carries the tag data to the receiver for amplification, demodulation, and decoding. The differential signal also carries any signal indicating a conductive object is near the magnetic fields. A myriad of other configurations are possible which do not depart from the scope of the present invention, including using a separate receiver antenna coil.

The magnetic field required to energize a tag is generated by currents flowing through antenna coils 112 and 114 arranged near the area where tags are to be read. In one embodiment for example, the antenna coils may be placed on opposite sides of a livestock chute (or "raceway"), with the tags (or a conductive object) passing between or alongside the antenna coils. Although in the present embodiment the antenna coils are constructed as nearly identical as possible, due to their environment there will often be small differences in inductance and AC resistance between the antenna coils. Inductance balance and resistive balance controls 234 allow for initial correction for those differences, nulling the difference signal.

If there is a tag or a conductive object in the field, the difference between the signals from the two antenna coils will appear as the difference signal at the receiver input. In the case of a conductive object, the signal will consist of a magnetic disturbance. In the case of a tag, the signal will consist of the carrier frequency and sidebands due to the modulation on the carrier, centered around the carrier at, for example, 134.2 KHz. This received signal goes through a filter 226, reducing the bandwidth, and attenuating noise components outside the pass-band.

The filtered signal is demodulated into in-phase "I" and quadrature "Q" components by a synchronous demodulator 228. The demodulator 228 is driven by signals generated by the carrier generator. If there exists any signal component in-phase with the carrier, the "I" signal will be positive and if there exists any signal component out-of phase with the carrier, the "I" signal will be negative. This applies to the "Q" signal as well, but involves the quadrature component (90 degrees from the carrier) of the signal.

Ideally, the total voltage at the carrier frequency is represented by the square root of the sum of the squares of the "I" and "Q" components. In this exemplary embodiment the sum of the absolute values of "I" and "Q" may be used as an approximation. Two precision rectifiers 230 separately take the absolute value of the "I" and "Q" components, and the sum 232 is output as the demodulated signal amplitude. The amplitude information from the adder 232 contains the full duplex tag data encoded using phase shift keyed (PSK) modulation 240. The PSK decoder in conjunction with the housekeeping microprocessor recovers the data and clock for input to the control processor.

If the antenna coils 112 and 114 were perfectly identical, and the differential transformer was wound perfectly, the antenna coil currents would be identical, and the difference would be zero when no conductive objects and/or a tag was near the fields. Simply, no carrier would be present in the received signal. In reality, the antenna coils 112 and 114 and the current directed to them will not be precisely balanced, and some carrier will leak through, resulting in a DC offset in the "I" and "Q" signals. This DC offset is read by the housekeeping microprocessor, which drives two multiplying digital to analog converters, adding sufficient "I" and "Q" components of the outgoing carrier into the incoming signal to null the remaining carrier. These correcting "I" and "Q" components combine to form a signal equal but exactly opposite in phase to the remaining carrier signal from the differential transformer, thus forcing the DC offsets in the demodulated "I" and "Q" signals back to zero.

The first two sections of the receive amplifier/filter pass the HDX frequencies between approximately 124 and 135 KHz. This band is fed to a phased locked loop set to about 129 KHz center frequency, which extracts and decodes the frequency shift keyed (FSK) data and clock signal in conjunction with a program sharing space in the carrier generator microprocessor. The HDX tag decoding occurs only when the carrier is off, so there is no interference between the two functions in the same chip.

In another embodiment, a communications interface provides a two-way communications link to an external computer, terminal, or any other data collection and control device known to one skilled in the art. Further, an EEPROM stores various operating parameters and options during power off conditions. It may be located in one of the microprocessors and/or in a separate chip on a PC board.

Figure 3:
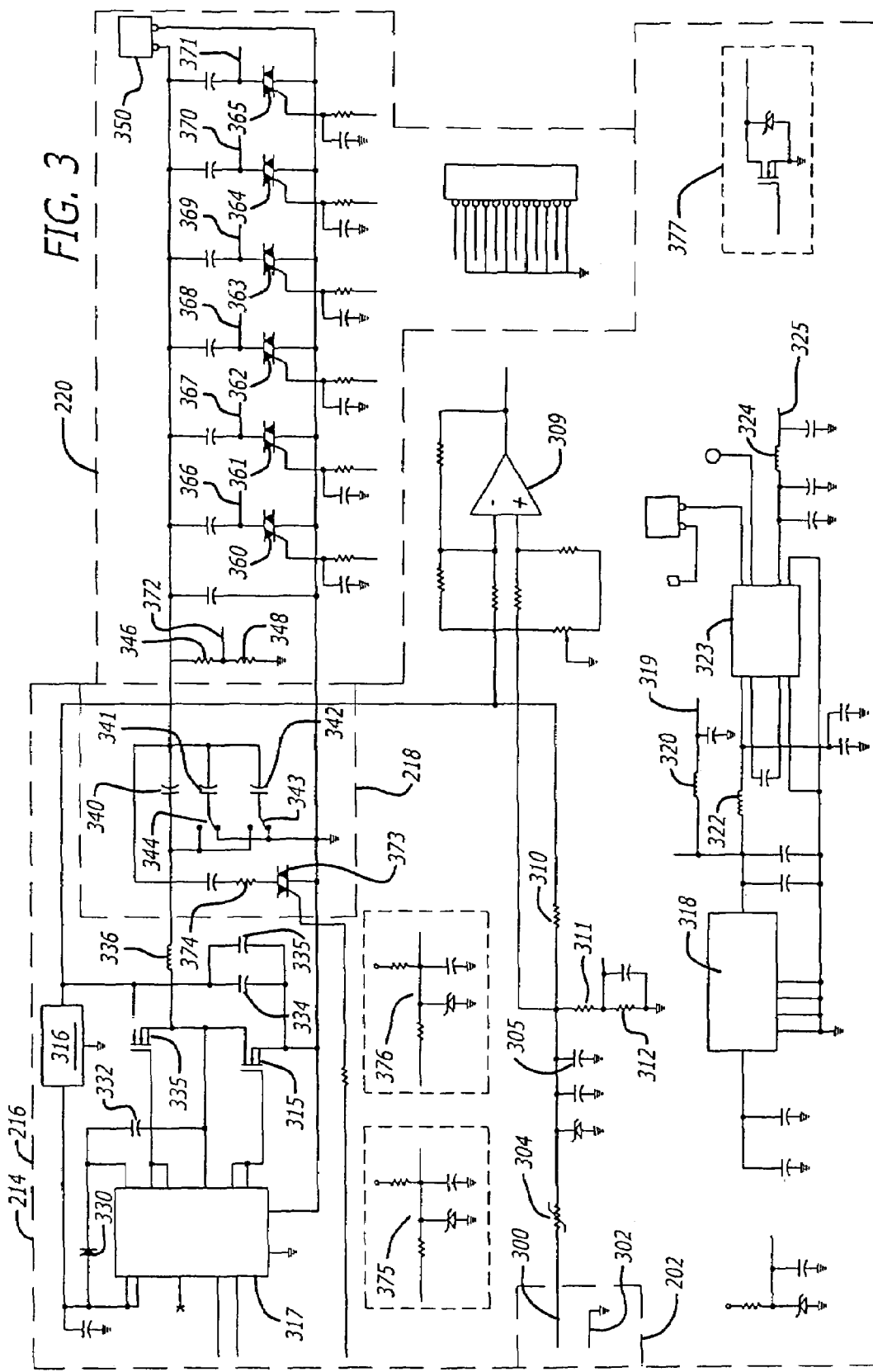
FIG. 3 illustrates exemplary power supply, antenna coil driver, and auto-tuning circuitry of the present invention.

FIG. 3 illustrates exemplary power supply, antenna coil driver, and auto-tuning circuitry 104 corresponding to the block components 104 described above for FIG. 2. The corresponding circuit blocks to the power supply 202, coil drive switches 214, power level adjust 216, impedance matching network 218, and auto-tuning circuitry 220 in FIG. 2 are indicated in more detail in FIG. 3 as 202, 214, 216, 218 and 220 respectively. FIG. 3 is an exemplary circuit diagram and it should be noted that many circuit and component variations are contemplated and their incorporation would not depart from the scope of the present invention.

A DC power supply voltage is applied to terminals 300 and 302 directing the current through a resettable fuse 304. The current is then smoothed by a capacitor 305 and a differential amplifier 309 provides a 0 to 5 volt output proportional to the current through resistor 310 while resistors at 311 and 312 scale the input voltage to 5 volts. The input current is fed into the antenna coil drive nMOSFET switches 314 and 315 and to a 10 volt regulator 316. This 10 volt line supplies CMOS driver 317, a 5 volt regulator 318 and various other components. The five volt regulator 318 supplies a digital Vcc directly, and an analog 5 volts 319 through a filter 320. Through filter 322 the voltage regulator 318 also supplies voltage inverter 323 which provides a −4.5 volt supply to the filter 324 and a −4.5 output 325.

CMOS driver 317 provides separate gate drivers for antenna coil drive nMOSFET switches 314 and 315. Diode 330 and capacitor 332 boost the gate drive voltage above the supply rail so both MOSFETs can be n-channel. Capacitors 334 and 335 provide a low-impedance voltage supply for the switches to minimize carrier frequency coupling to the board. Inductor 336 reduces the high frequency switching edges for the same reason. Internal diodes (not shown) across the MOSFETS provide a current path to the DC supply or ground when both switches are off.

Capacitors 340, 341, and 342 form part of a tuned impedance matching network along with parallel tuning capacitors and a antenna coil(s). Capacitor 340 is always in place and represents the highest impedance setting (lowest antenna coil drive power) while capacitors 341 and 342 can be switched by switches 343 and 344 either parallel to the antenna coil or parallel to capacitor 340. In this way, they maintain the resonant frequency constant and when in parallel with capacitor 340 they reduce the drive impedance into the antenna coil, increasing the power at a given voltage. This provides four selectable power settings for any input voltage without affecting the antenna coil tuning. Resistors 346 and 348 divide the antenna coil drive voltage to a reference level. Power is supplied to the transmit antennas at 350.

Triacs 360-365 and capacitors 366-371 enable automatic tuning of the antenna coil by digital signals. The circuit behaves as a digital to capacity converter since the capacitors are in a binary sequence. The digital combination applied to the Triac gates by a microprocessor turns on the appropriate capacitors to provide the required tuning value. Resonance occurs when the digital antenna coil switch signal is in quadrature (90 degrees) with the output carrier phase at reference point 372.

Triac 373 is turned on briefly when, the antenna coil power is turned off to absorb the stored resonant energy in resistor 374, quenching oscillations in the antenna coils. The read trigger 375 and auxiliary input 376 circuits allow the control microprocessor to respond to external switch inputs while protecting itself from external transients. In the auxiliary output circuit 377, the AUX-OUT line is pulled low to allow the microprocessor to control external events.

Figure 4:
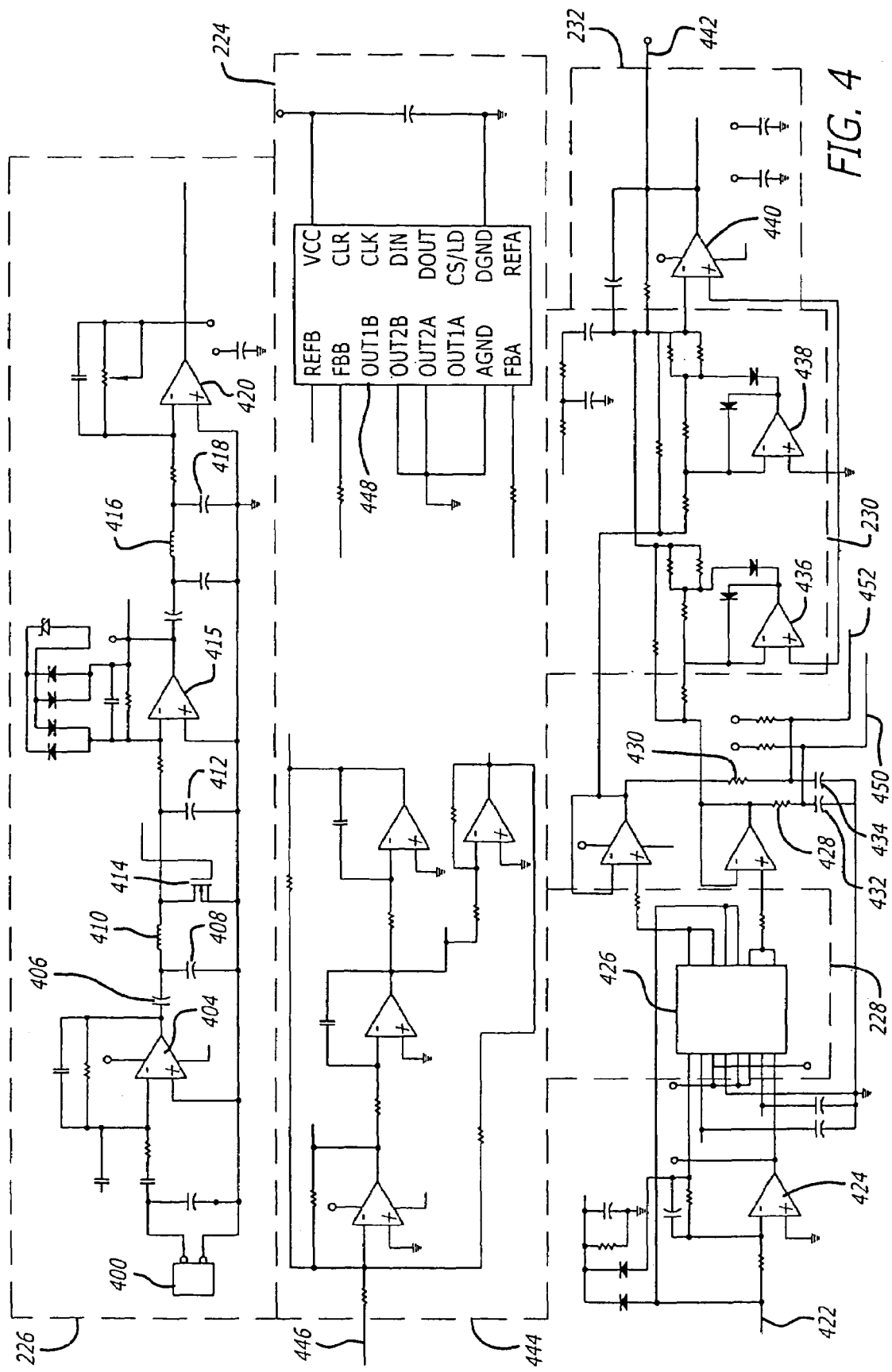
FIG. 4 illustrates exemplary reception and auto-null circuitry of the present invention.

FIG. 4 illustrates exemplary receiving and auto-null circuitry 108 corresponding to the block components 108 described above for FIG. 2. The corresponding circuit blocks to the auto null circuitry 224, receiver amplifier and filters 226, demodulator 228, rectifier 230, and adder circuitry 232 in FIG. 2 are indicated in more detail in FIG. 4. FIG. 4 is an exemplary circuit diagram and it should be noted that many circuit and component variations are contemplated and their incorporation would not depart from the scope of the present invention.

An unbalanced signal from the splitter's differential transformer (described in FIG. 7) is received at point 400. For exemplary purposes, this signal may be read at 134.2 khz. Capacitor 402 provides initial noise rejection while amplifier 404 amplifies and low-passes the signal to further reduce the noise. Capacitors 406 and 408 match impedances between the amplifiers 404 and a tank circuit consisting of an inductor 410 and a capacitor 412, which provides a filter pole.

The FET (Field Effect Transistor) 414 turns on briefly after antenna coil power is removed to quiet any resulting transients. Amplifier 414 boosts the voltage to a filter consisting of inductor 416 and capacitor 418. If the received transponder signal is a half duplex signal (HDX) the HDX signal is taken before the last filter pole and if the received transponder signal is a full duplex signal (FDX), the FDX signal continues on to 422. An amplifier 420 provides gain to drive an inverter 424 and a demodulator 426.

CMOS switches in demodulator 426 select either the direct signal or the inverted signal, depending upon the phase of the square wave in-phase and square wave quadrature signals from a carrier generator chip. This demodulates the received signal into one component in phase with the carrier, and one component in quadrature to the carrier. Resistors 428 and 430 and capacitors 432 and 434 integrate the in-phase (I) and quadrature (Q) components for use in an auto-nulling feature (described below). The I and Q signals are also rectified in amplifiers 436 and 438 and summed in amplifier 440. The result is a demodulated full duplex signal (at baseband) at 442, ready for phase shift keyed (PSK) or frequency shift keyed (FSK) decoding (described in FIG. 5).

Small changes in the antenna coil environment may cause impedance shifts and hence allows carrier feed-through. The present invention features an auto-nulling feature which removes such carrier feed-through when it is desirable. Circuit 444 forms a state variable active filter which takes a sample REF_I446 of the outgoing carrier, and provides I and Q reference voltages (I+, I−, Q+, Q−) to a dual multiplying digital to analog converter 448 with current output feeding the summing junction at 404. These currents add to form a signal opposite in phase but equal in amplitude to the carrier, nulling the feedthrough. Output from the demodulator 426 is controlled by processor (housekeeping microprocessor, by the multiplexer) over a local serial bus by measuring the voltages at OFFSET_I 450 and OFFSET_Q 452.

Figure 5:
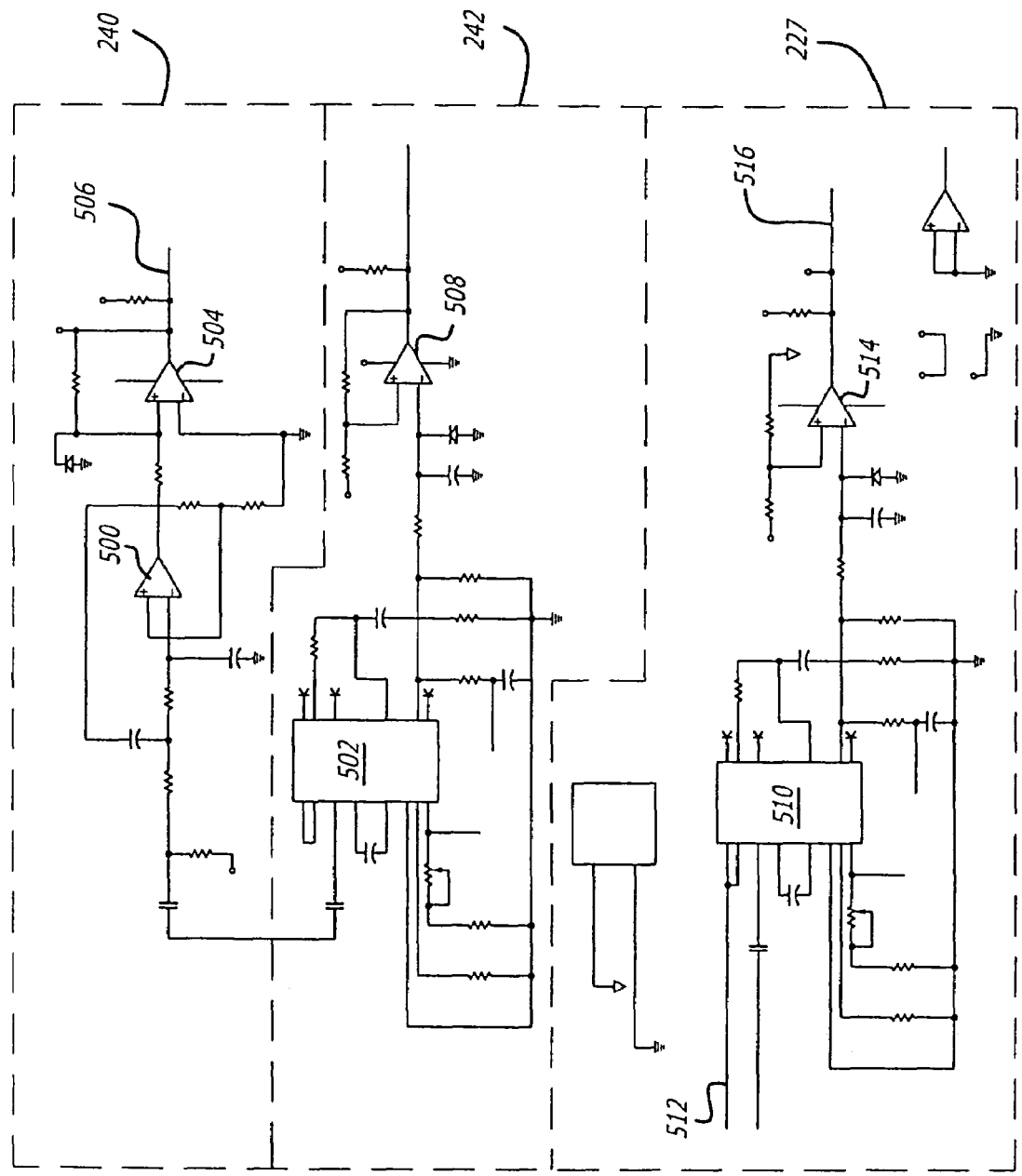
FIG. 5 illustrates an exemplary decoding circuitry of the present invention.

FIG. 5 illustrates exemplary decoding circuitry 110" corresponding to the block components 110' described above for FIG. 2. The corresponding circuit blocks to the HDX decoder 227, PSK decoder 240, and the FSK decoder 242, in FIG. 2 are indicated in more detail in FIG. 5. FIG. 5 is an exemplary circuit diagram and it should be noted that many circuit and component variations are contemplated and their incorporation would not depart from the scope of the present invention.

The baseband signal feeds both low pass filter 500 and decoder 502. The low pass filter 500 drives comparator 504 which squares-up the phase shift keyed signal for the microprocessor to decode PSK_COMP 506. Decoder 502 decodes frequency shift keyed signals. The voltage controlled oscillator signal is squared for the microprocessor at 508. (Many types of encryption may be used).

The half duplex signal is frequency shift keyed, shifting between approximately 124 KHz and 134.2 KHz, so it is split off from the receive filter at the second stage and fed to a phase locked loop 510 with a center frequency of about 128 KHz. The voltage controlled oscillator output frequency goes to processor 610 (FIG. 6) as the data clock HDX_CAR 512, while the VCO control voltage is squared-up by amplifier 514 and sent to processor 610 (FIG. 6) as the data stream HDX_COMP 516. Processor 610 (FIG. 6) also functions as the carrier drive timing generator, but since the half duplex tag is read only while the carrier is off, processor 610 (FIG. 6) can serve this dual function.

Figure 6:
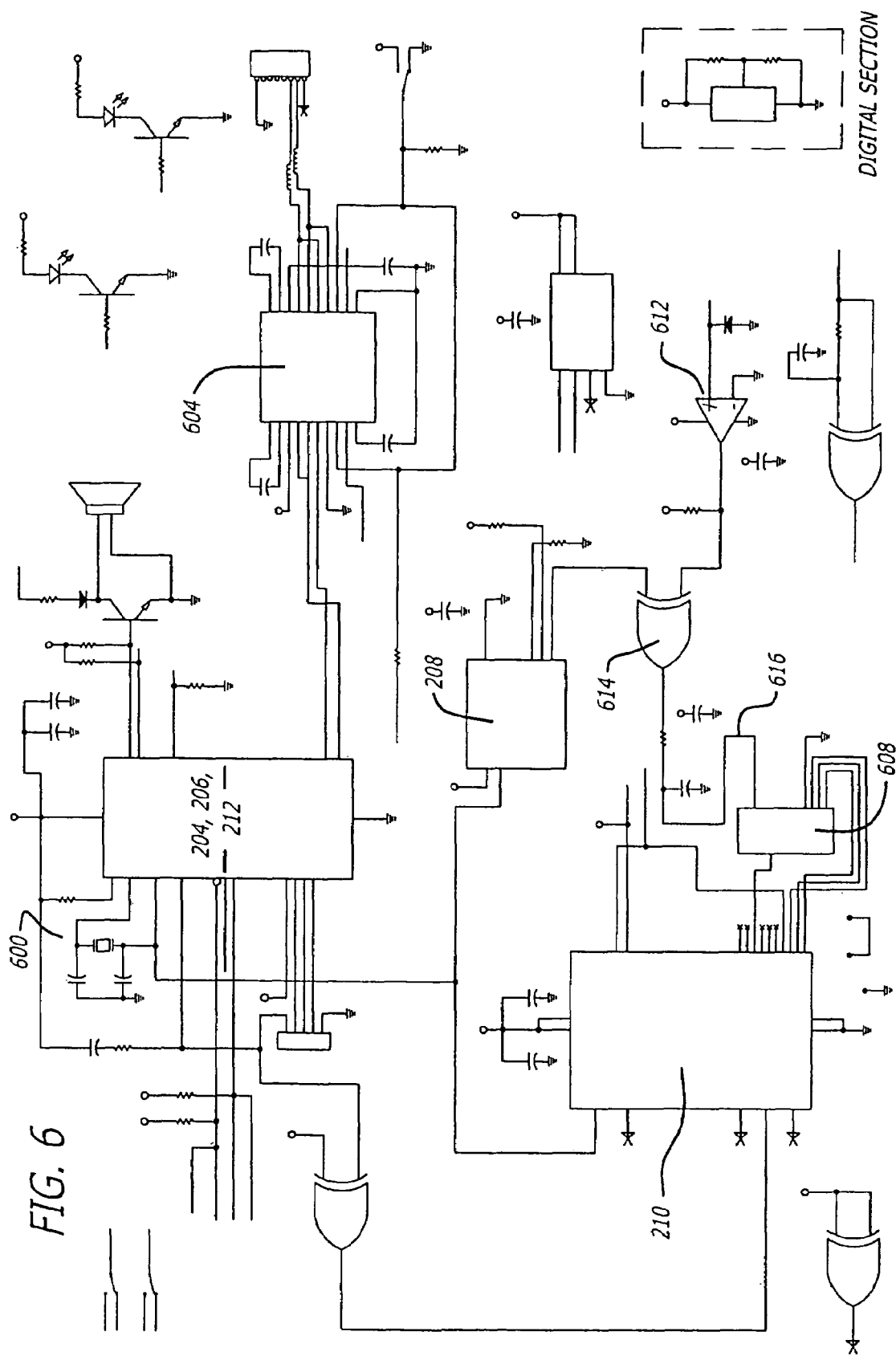
FIG. 6 illustrates exemplary processors of the present invention.

FIG. 6 illustrates exemplary processor, memory, and communications circuitry 102 corresponding to the block components 102 described above for FIG. 2. The corresponding circuit blocks to the memory 204, controller 206, carrier generator 208, house keeping microprocessor 210, and communications I/O processor 212 in FIG. 2 are indicated in more detail in FIG. 3. FIG. 6 is an exemplary circuit diagram and it should be noted that many circuit and component variations are contemplated and their incorporation would not depart from the scope of the present invention.

Basic timing and control of the system is provided by crystal 600 and master microprocessor 206. Microprocessor 206 runs the software that facilitates external communications, communication with other microprocessors, audio output, flashing lights, reading external control switches, decoding and formatting received tag data, displaying data on an LCD, storing user options and parameters either in an internal EEPROM 204 or another memory device, and generally keeping tack of overall system operation.

Housekeeping microprocessor 210 measures analog voltages through multiplexer 608 interfaces to the auto-tune and auto-null hardware, and generally handles internal affairs of the reader. Carrier timing generator 610 divides the clock frequency to provide precise timing signals for generating the carrier (PULL-UP and PULL-DOWN) and demodulating the received signal (SQI, SQQ). In addition, when its not busy with the antenna coil signals, it decodes the half duplex tag in conjunction with processor 510 previously described. Comparator 612 detects zero crossings which are compared with SQI in XOR gate 614 to generate a phase error voltage (TUN_ERR) 616 at multiplexer 608 so processor 606 can control the TRIAC autotuning switches on FIG. 3.

Figure 7:
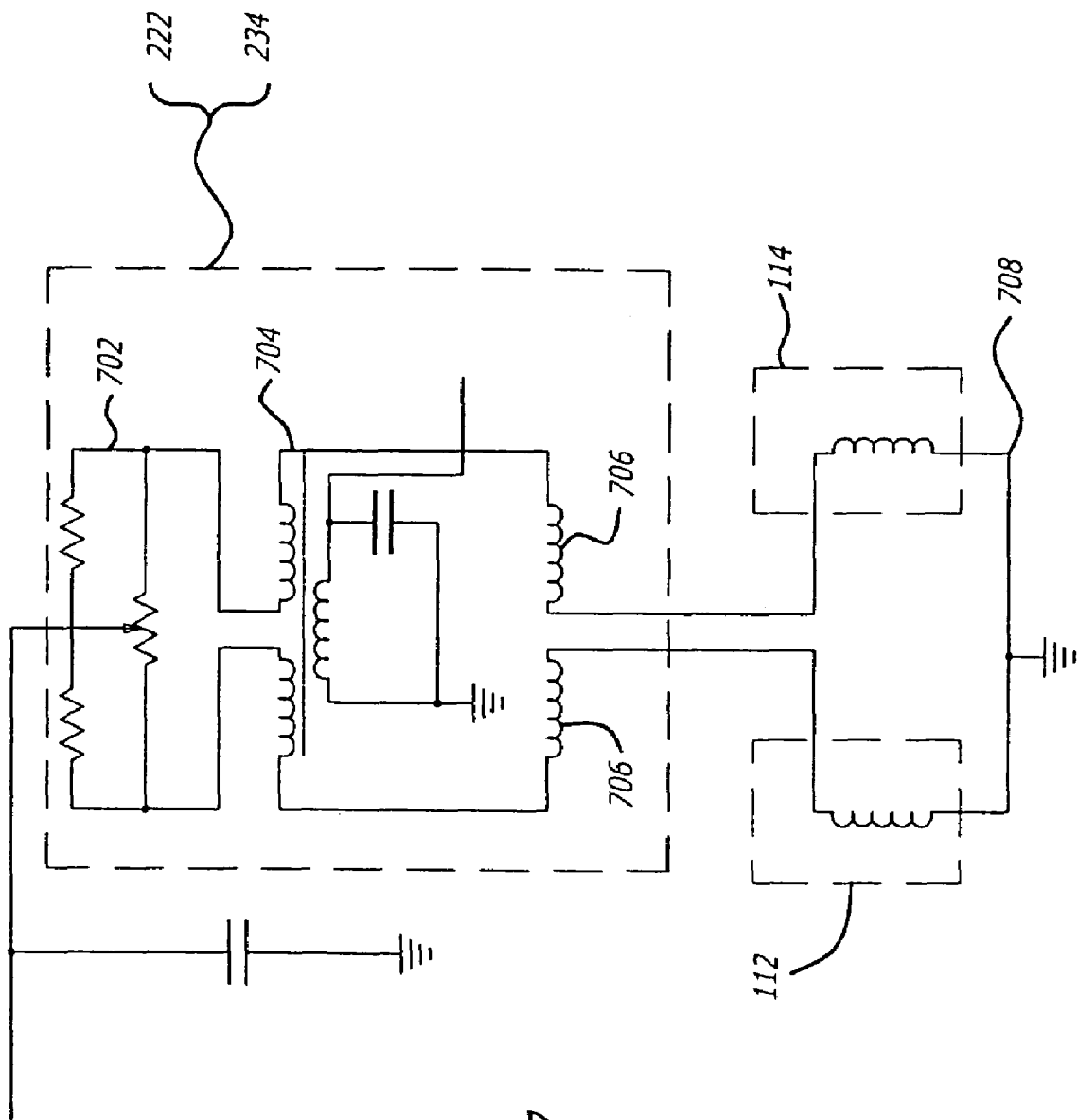
FIG. 7 illustrates an exemplary splitter, coil balance, and antenna coils of the present invention.

FIG. 7 illustrates exemplary splitter and coil balancing circuitry, and antenna coils 106 corresponding to the block components 106 described above for FIG. 2. The corresponding circuit blocks to the splitter 222, Coil Balance 234, and antenna coils 112 and 114, in FIG. 2 are indicated in more detail in FIG. 7. FIG. 7 is an exemplary circuit diagram and it should be noted that many circuit and component variations are contemplated and their incorporation would not depart from the scope of the present invention.

In the present embodiment, current driving the two antenna coils 708 is balanced by a resistive balancing network 702 and an adjustable differential inductor 706 which allow a user to equally balance the current driven to the two antenna coils. A differential transformer 704 measures the difference in current between the two antenna coils 112 and 114 which is reflective of either the data contained in a half duplex or full duplex transponder and/or indicative of an object passing through the magnetic fields.

Although an antenna "coil" is described above the present invention, it is to be understand that any type of antenna, coiled or otherwise, known in the art may be used.

The foregoing description of FIGS. 3 to 7, and the figures themselves, depict a representative circuit and the primary components which those skilled in the art will understand may be modified for various applications. For completeness in detail, included herewith as appendix FIGS. 3A, 4A, 5A, 6A and 7A are detailed circuit diagrams which include reference values for the circuit elements of corresponding FIGS. 3-7.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

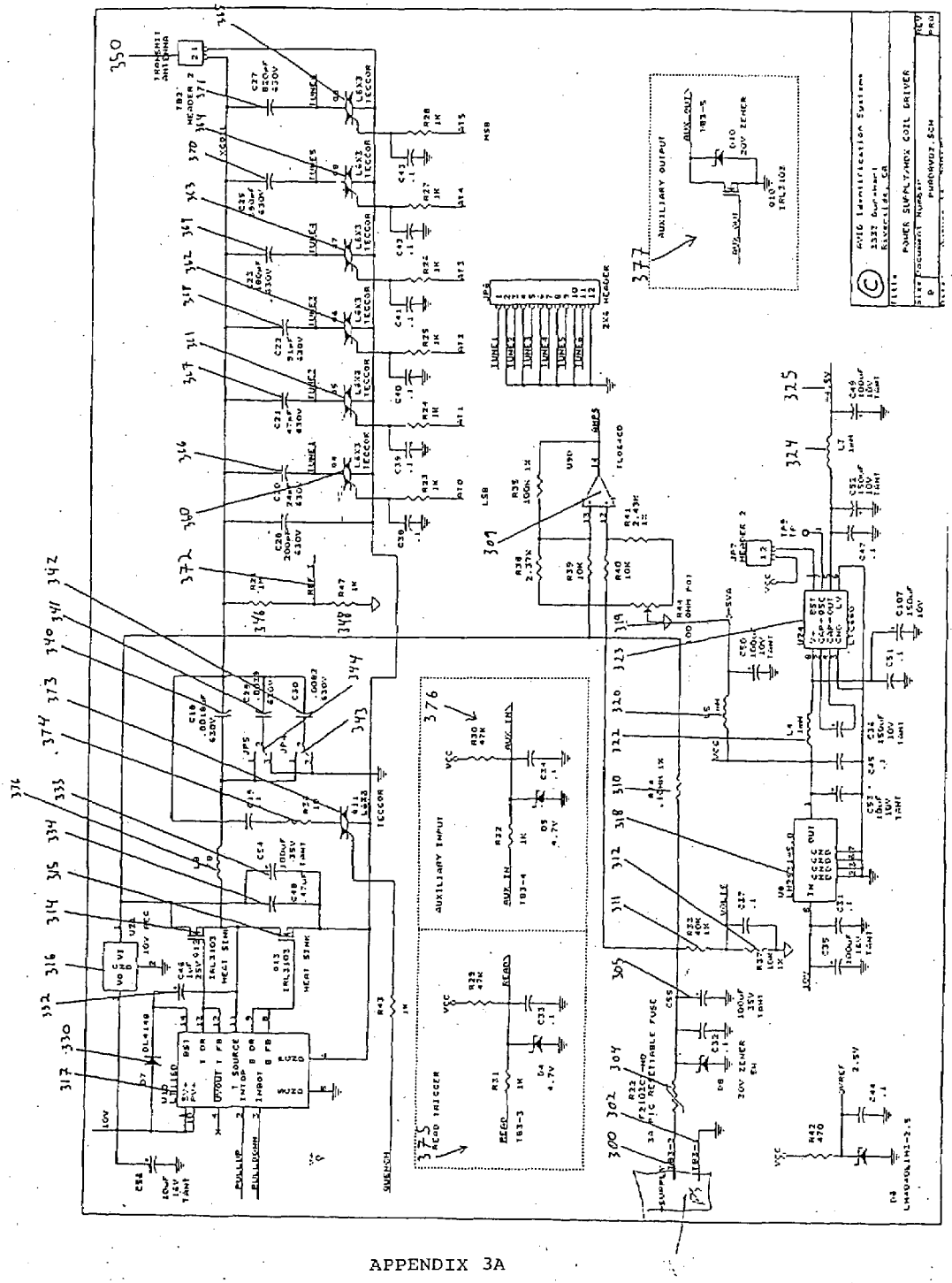
APPENDIX 3A

APPENDIX 4A
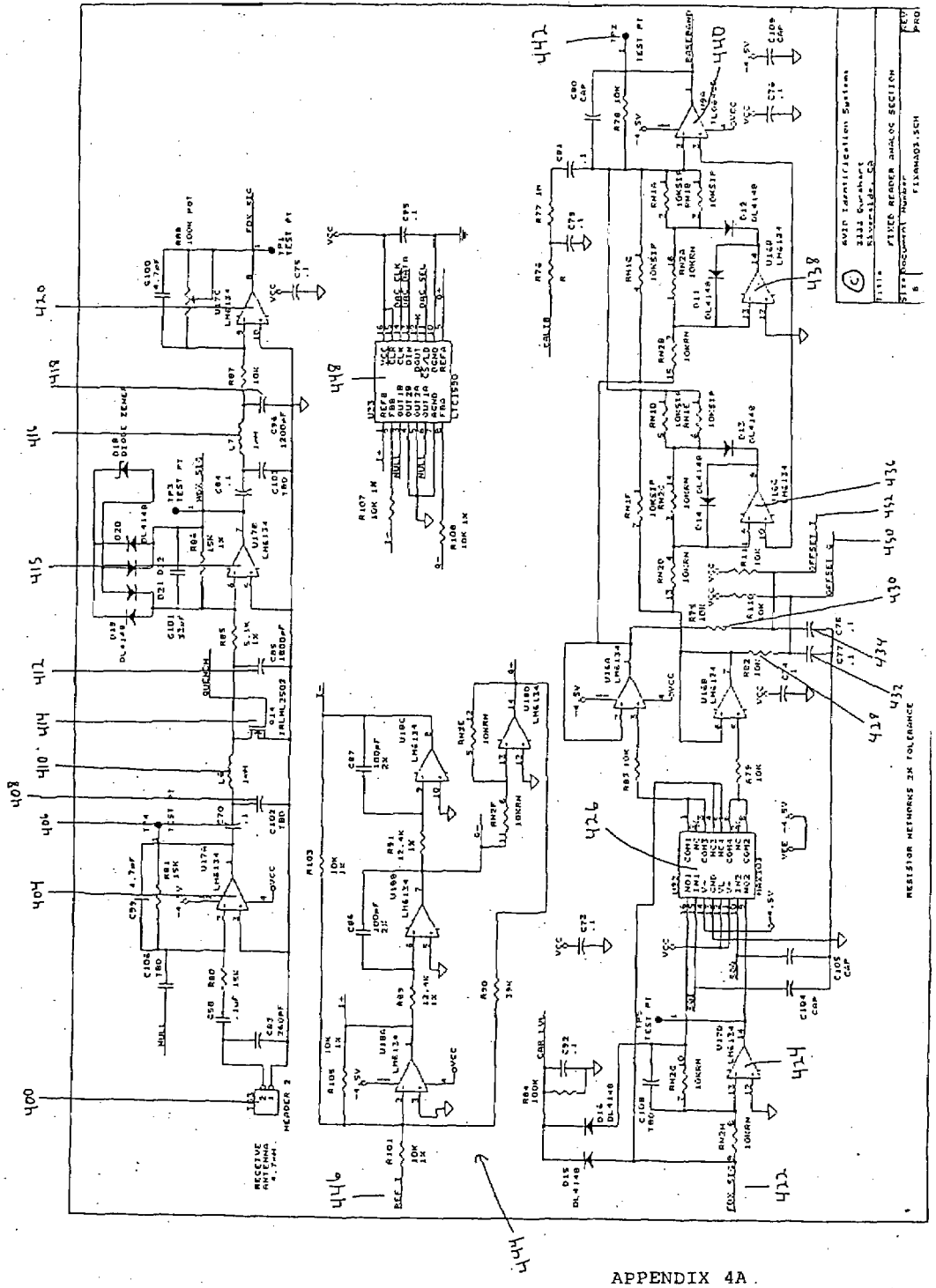
APPENDIX 4A

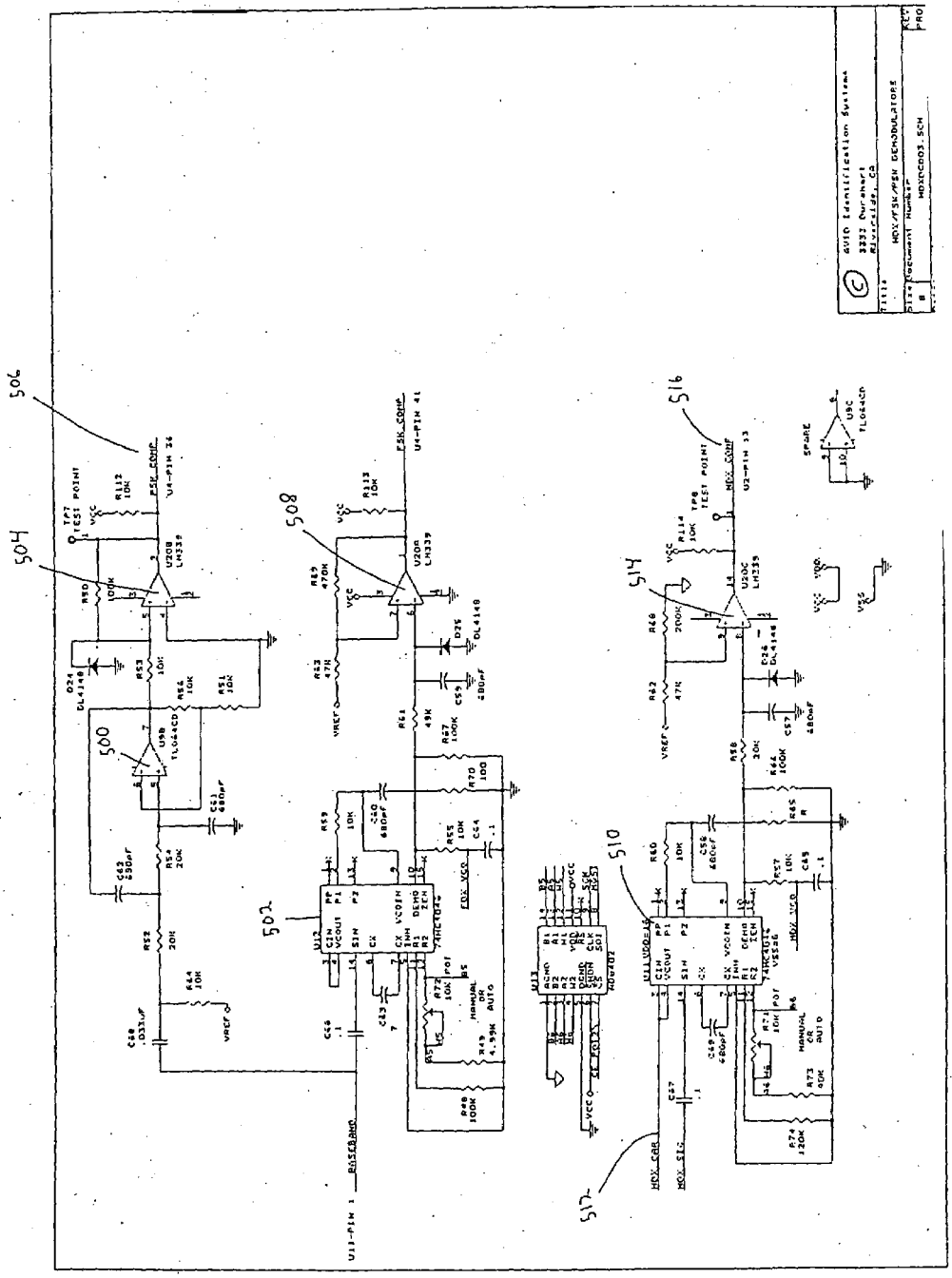
APPENDIX 5A

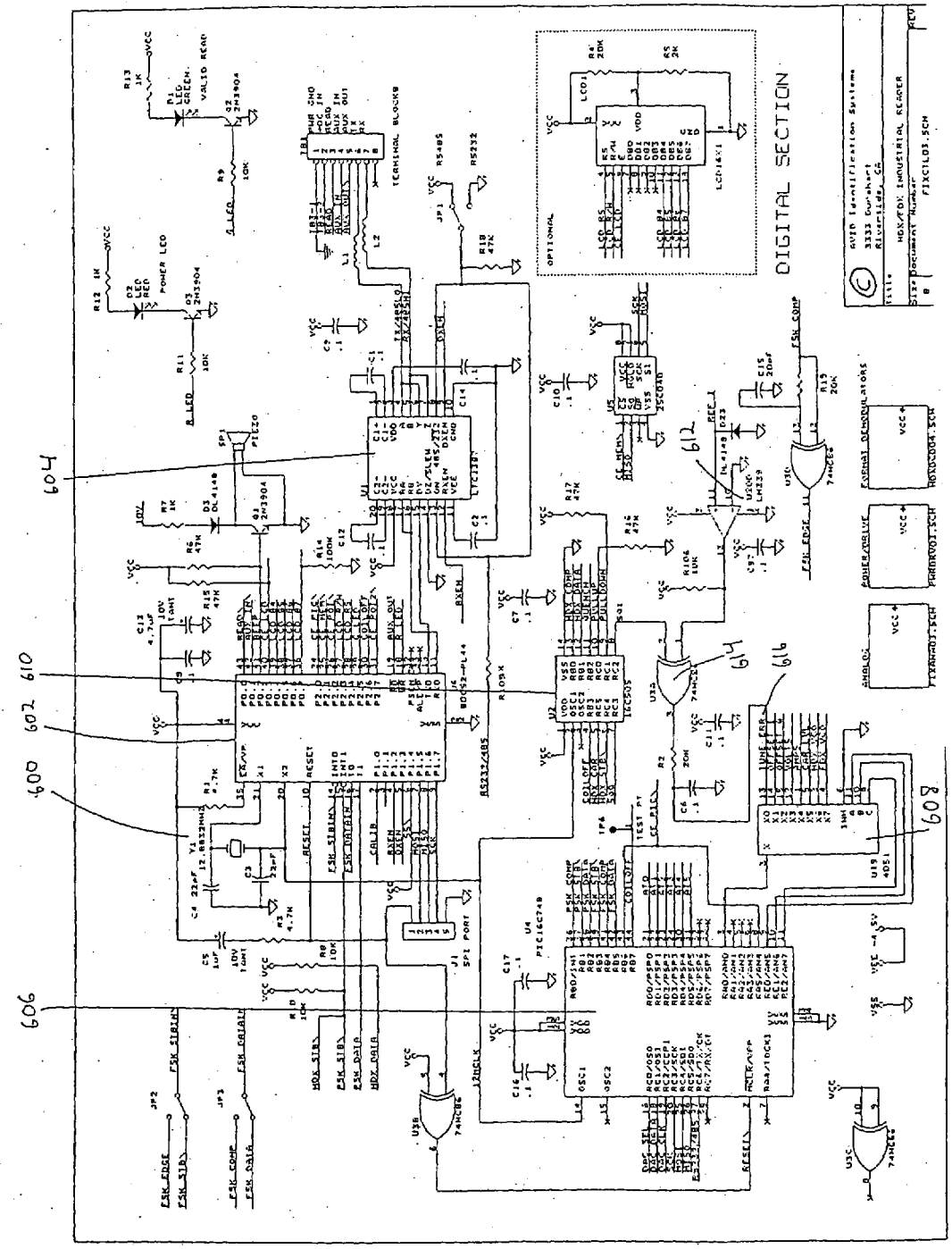
APPENDIX 6A

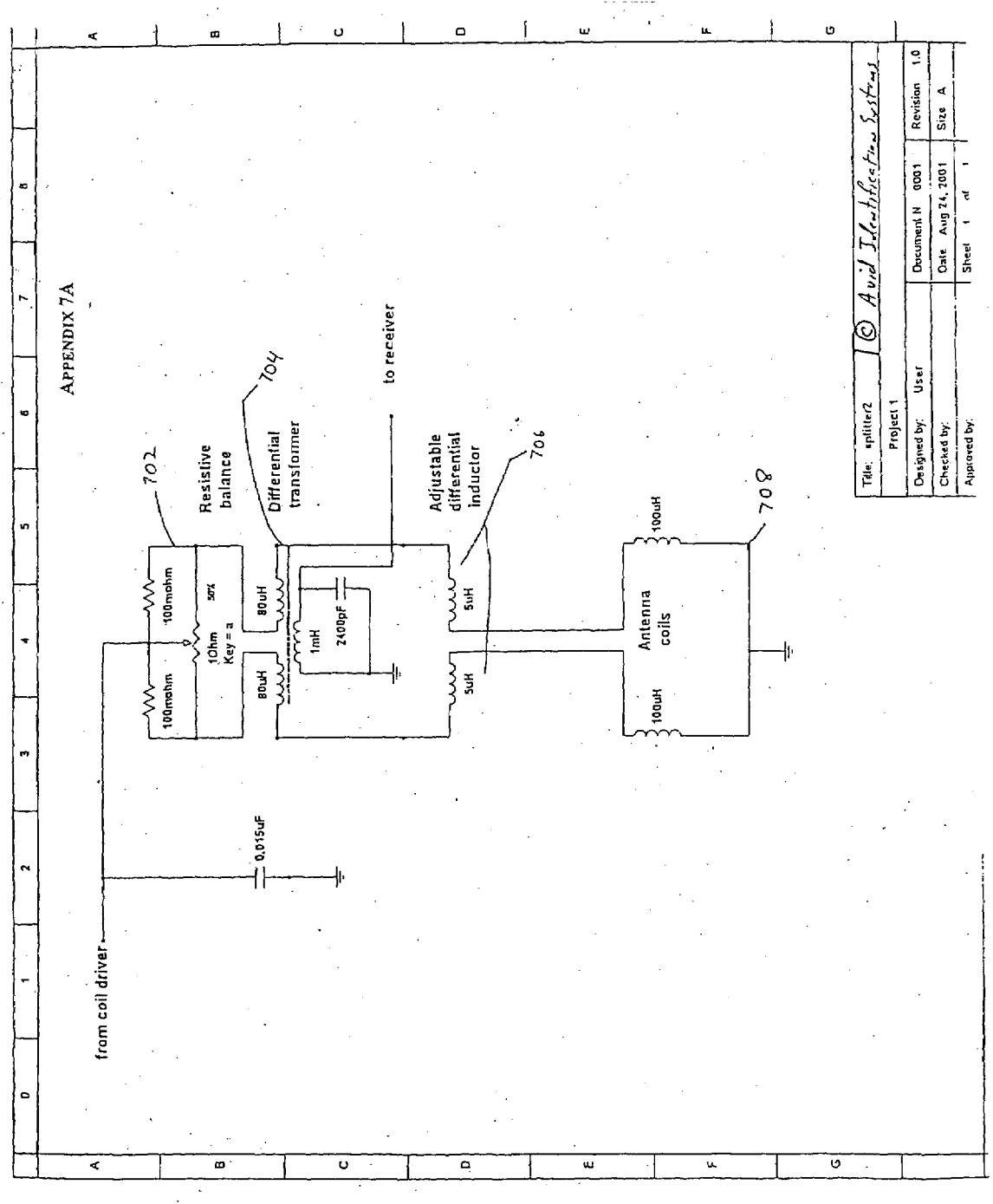
APPENDIX 7A

What is claimed is:

1. An interrogator for a radio frequency identification device comprising:
    an antenna driver circuit including a power supply, coil driver switches, a power level adjust circuit, an impedance matching network, and an auto-tune circuit;
    a first antenna;
    a second antenna;
    a splitter circuit communicatively coupled to said antenna driver circuit and said first and second antennas, respectively; and
    an auto-nulling circuit to null any offset between current in the first antenna and the second antenna.

2. The interrogator according to claim 1 further comprising a difference current detector communicatively coupled to splitter to obtain a signal derived from a field differential between the first antenna as compared to the second antenna.

3. The interrogator according to claim 2 wherein the difference current detector is a differential transformer.

4. The interrogator according to claim 1 further comprising a receiver to receive the signal derived from the field differential and a decoder to process the signal to obtain encoded information.

5. The interrogator of claim 4 wherein said receiver further comprises:
    decoder circuitry to provide decoding of phase shift keyed signals and frequency shift keyed signals.

6. The interrogator according to of claim 1 wherein said splitter further includes an antenna balance circuit to adjust the first and second antennas so that the driving signals to the first and second antennas are substantially equivalent.

7. The interrogator according to claim 1 further comprising an auto-tuning circuitry to tune the drive current provided to the first and second antennas to a desired resonance.

8. The interrogator of claim 1, wherein said splitter circuit further comprises:
    a signal splitter to receive the drive signal from said antenna driver circuit.

9. The interrogator of claim 8, wherein said signal splitter includes a coil balance circuit.

10. An interrogator comprising:
    an antenna driver circuit including a power supply, coil driver switches, a power level adjust circuit, an impedance matching network, and an auto-tune circuit;
    a splitter circuit communicatively coupled to the antenna driver circuit to, receive a drive signal and split the drive signal and generate balanced drive signals;
    a first antenna communicatively coupled to the splitter circuit to receive said first balanced drive signal;
    a second antenna communicatively coupled to the splitter circuit to receive said second balanced drive signal; and
    a receiver communicatively coupled to the first and second antennas to receive and decode a transponder signal obtained by said first and second antennas, said receiver including an auto-nulling circuit to null any offset between current in the first antenna and the second antenna.

11. The interrogator according to claim 10, further comprising a difference current detector communicatively coupled to said splitter to obtain a signal derived from a field differential between the first antenna as compared to the second antenna.

12. The interrogator according to claim 11, wherein the difference current detector is a differential transformer.

13. The interrogator according to claim 10, further comprising a decoder to process a signal from said receiver to obtain encoded information.

14. The interrogate according to claim 10, wherein said splitter circuit further includes an antenna balance circuit to adjust the first and second antennas so that the driving signals to the first and second antennas are substantially equivalent.

15. The interrogator according to claim 10, further comprising an auto-tuning circuitry to tune the drive current provided to the first and second antennas to a desired resonance.

16. The interrogator of claim 10, wherein said splitter circuit further comprises:
    a signal splitter to receive the drive signal from said antenna driver circuit.

17. The interrogator of claim 16, wherein said signal splitter includes a coil balance circuit.

18. The interrogator of claim 10 wherein said receiver further comprises:
    decoder circuitry to provide decoding of phase shift keyed signals and frequency shift keyed signals.

19. A field effect detector/interrogator to detect a variations in an electro magnetic field comprising:
    an antenna driver;
    a first antenna;
    a second antenna; and
    a splitter circuit coupling said antenna driver to said first and second antennas respectively; and
    a differential transformer difference current detector communicatively coupled to said splitter to measure any differential currents imposed on the first and second antennas to obtain a signal derived from a field differential between the first antenna as compared to the second antenna.

20. The field effect detector/interrogator according to claim 19 further comprising a receiver to receive the signal derived from the field differential and a decoder to process the signal obtain encoded information.

21. The field effect detector/interrogator according to claim 19 where the difference current detector further includes a receiver having an auto-null circuit to null any offset between current in the first antenna and the second antenna.

22. The field effect detector/interrogator of claim 21, wherein said receiver further comprises:
    an auto-null circuit for receiving an output signal from said splitter circuit;
    a receiver amp filter connected to said auto-null circuit to receive auto-nulled signals to output a filtered and auto-nulled signal; and
    a synchronous demodulator to receive said filtered and auto-nulled signal from said receiver amp filter.

23. The field effect detector/interrogator of claim 22 wherein said receiver further comprises:
    a rectifier to rectify the output of said synchronous demodulator; and
    an adder to receive a rectified signal from said rectifier and output a signal.

24. The field effect detector/interrogator according to claim 19 wherein said splitter circuit further includes an antenna balance circuit to adjust the first and second antennas so that the driving signals to the first and second antennas are substantially equivalent.

25. The field effect detector/interrogator according to claim 19 further comprising; an auto-tuning circuitry to tune the drive current provided to the first and second antennas to a desired resonance.

26. The field effect detector/interrogator of claim 19, wherein said antenna driver further comprises:

a power supply;
coil driver switches;
a power level adjust circuit;
an impedance matching network; and
an auto-tune circuit.

27. The field effect detector/interrogator of claim 26, wherein said auto tune circuit further comprises;
a plurality of trim capacitors; and
a phase detector to compare an antenna coil signal to the drive signal to generate a phase error signal to control the switching of said trim capacitors.

28. The field effect detector/interrogator of claim 19, wherein said splitter circuit further comprises:
a signal splitter to receive the drive signal from said antenna driver.

29. The field effect detector/interrogator of claim 28, wherein said signal splitter includes a coil balance circuit.

30. The field effect detector/interrogator of claim 19 wherein said difference current detector further comprises:
decoder circuitry to provide decoding of phase shift keyed signals and frequency shift keyed signals.

31. The field effect detector/interrogator claim 19 wherein said difference current detector includes circuitry for detecting a magnetic field variation caused by the passage of an animal through an electromagnetic field, emitted by said first and second antennas.

32. The field effect detector/interrogator of claim 31 wherein the animal is a human, a pet or livestock.

33. An interrogator for a radio frequency identification device comprising:
an antenna driver circuit;
a first antenna;
a second antenna; and
a splitter circuit communicatively coupling said antenna driver circuit to said first and second antennas, respectively, wherein said antenna driver circuit further comprises:
a power supply;
coil driver switches;
a power level adjust circuit;
an impedance matching network; and
an auto-tune circuit.

34. The interrogator of claim 33, wherein said auto tune circuit further comprises:
a plurality of trim capacitors; and
a phase detector to compare an antenna coil signal to the drive signal to generate a phase error signal to control the switching of said trim capacitors.

35. An interrogator for a radio frequency identification device comprising:
an antenna driver circuit;
a first antenna;
a second antenna; and
a splitter circuit communicatively coupling said antenna driver circuit to said first and second antennas, respectively;
a receiver to receive the signal derived from the field differential and a decoder to process the signal to obtain encoded information; wherein said receiver further comprises:
an auto-null circuit for receiving an output signal from said splitter circuit;
a receiver amp filter connected to said auto-null circuit to receive auto-nulled signals to output a filtered and auto-nulled signal; and
a synchronous demodulator to receive said filtered and auto-nailed signal from said receiver amp filter.

36. The interrogator of claim 35 wherein said receiver further comprises:
a rectifier to rectify the output of said synchronous demodulator; and
an adder to receive a rectified signal from said rectifier and output a signal.

37. An interrogator comprising:
an antenna driver circuit;
a splitter circuit communicatively coupled to the antenna driver circuit to receive a drive signal and split the drive signal and generate balanced drive signals;
a first antenna communicatively coupled to the splitter circuit to receive said first balanced drive signal;
a second antenna communicatively coupled to the splitter circuit to receive said second balanced drive signal;
auto-tuning circuitry to tune the drive current provided to the first and second antennas to a desired resonance;
a receiver communicatively coupled to the first and second antennas to receive and decode a transponder signal obtained by said first and second antennas wherein said antenna driver circuit further comprises:
a power supply;
coil driver switches;
a power level adjust circuit;
an impedance matching network; and
an auto-tune circuit.

38. The interrogator of claim 37, wherein said auto tune circuit further comprises:
a plurality of trim capacitors; and
a phase detector to compare an antenna coil signal to the drive signal to generate a phase error signal to control the switching of said trim capacitors.

39. An interrogator comprising:
an antenna driver circuit;
a splitter circuit communicatively coupled to the antenna driver circuit to receive a drive signal and split the drive signal and generate balanced drive signals;
a first antenna communicatively coupled to the splitter circuit to receive said first balanced drive signal;
a second antenna communicatively coupled to the splitter circuit to receive said second balanced drive signal; and
a receiver communicatively coupled to the first and second antennas to receive and decode a transponder signal obtained by said first and second antennas wherein said receiver further comprises:
an auto-null circuit for receiving an output signal from said splitter circuit; a receiver amp filter connected to said auto-null circuit to receive auto-nulled signals to output a filtered and auto-nulled signal; and
a synchronous demodulator to receive said filtered and auto-nulled signal from said receiver amp filter and;
a rectifier to rectify the output of said synchronous demodulator; and
an adder to receive a rectified signal from said rectifier and output a signal.

40. An interrogator for a radio frequency identification device comprising:
an antenna driver circuit;
a first antenna;
a second antenna; and
a splitter circuit communicatively coupled to said antenna driver circuit such that said splitter circuit splits a drive current generated by said antenna driver circuit into substantially similar first and second antenna currents directed to said first and second antennas, respectively and further including an auto-nulling circuit to null any offset between current in the first antenna and the second antenna.

41. An interrogator for a radio frequency identification device comprising:
an antenna driver circuit;
a first antenna;
a second antenna; and
a splitter circuit communicatively coupled to said antenna driver circuit such that said splitter circuit splits a drive current generated by said antenna driver circuit into substantially similar first and second antenna currents directed to said first and second antennas, respectively;
wherein said antenna driver circuit further comprises:
a power supply;
coil driver switches;
a power level adjust circuit;
an impedance matching network; and
an auto-tune circuit.

42. The interrogator of claim 41, wherein said auto tune circuit further comprises:
a plurality of trim capacitors; and
a phase detector to compare an antenna coil signal to the drive signal, to generate a phase error signal to control the switching of said trim capacitors.

43. An interrogator for a radio frequency identification device comprising:
an antenna driver circuit;
a first antenna;
a second antenna; and
a splitter circuit communicatively coupled to said antenna driver circuit such that said splitter circuit splits a drive current generated by said antenna driver circuit into substantially similar first and second antenna currents directed to said first and second antennas, respectively;
a receiver to receive the signal derived from the field differential and a decoder to process the signal to obtain encoded information comprising an auto-null circuit for receiving an output signal from said splitter circuit;
a receiver amp filter connected to said auto-null circuit to receive auto-nulled signals to output a filtered and auto-nulled signal; and
a synchronous demodulator to receive said filtered and auto-nulled signal from said receiver amp filter.

44. The interrogator of claim 43 wherein said receiver further comprises:
a rectifier to rectify the output of said synchronous demodulator; and
an adder to receive a rectified signal from said rectifier and output a signal.

45. An interrogator comprising:
an antenna driver circuit;
a splitter circuit communicatively coupled to the antenna driver circuit to receive a drive signal and split the drive signal into balanced drive signals;
a first antenna communicatively coupled to the splitter circuit to receive said first balanced drive signal;
a second antenna communicatively coupled to the splitter circuit to receive said second balanced drive signal; and
a receiver communicatively coupled to the first and second antennas, to receive and decode a transponder signal obtained by said first and second antennas where the receiver further includes an auto-nulling circuit to null any offset between current in the first antenna and the second antenna.

46. An interrogator comprising:
an antenna driver circuit;
a splitter circuit communicatively coupled to the antenna driver circuit to receive a drive signal and split the drive signal into balanced drive signals;
a first antenna communicatively coupled to the splitter circuit to receive said first balanced drive signal;
a second antenna communicatively coupled to the splitter circuit to receive said second balanced drive signal; and
a receiver communicatively coupled to the first and second antennas to receive and decode a transponder signal obtained by said first and second antenna;
wherein said antenna driver circuit further comprises:
a power supply;
coil driver switches;
a power level adjust circuit;
an impedance matching network; and
an auto-tune circuit.

47. The interrogator of claim 46, wherein said auto tune circuit
further comprises:
a plurality of trim capacitors; and
a phase detector to compare an antenna coil signal to the drive signal to generate a phase error signal to control the switching of said trim capacitors.

48. The field effect detector/interrogator of claim 46, wherein said receiver further comprises:
an auto-null circuit for receiving an out put signal from said splitter circuit;
a receiver amp filter connected to said auto-null circuit to receive auto-nulled signals to output a filtered and auto-nulled signal; and
a synchronous demodulator to receive said filtered and auto-nulled signal from said receiver amp filter.

49. The field effect detector/interrogator of claim 48 wherein said receiver further comprises:
a rectifier to rectify the output of said synchronous demodulator; and
an adder to receive a rectified signal from said rectifier and output a signal.

50. An interrogator comprising:
an antenna driver circuit;
a splitter circuit communicatively coupled to the antenna driver circuit to receive a drive signal and split the drive signal into balanced drive signals;
a first antenna communicatively coupled to the splitter circuit to receive said first balanced drive signal;
a second antenna communicatively coupled to the splitter circuit to receive said second balanced drive signal; and
a receiver communicatively coupled to the first and second antennas to receive and decode a transponder signal obtained by said first and second antenna wherein said receiver further comprises:
an auto-null circuit for receiving an output signal from said splitter circuit;
a receiver amp filter connected to said auto-null circuit to receive auto-nulled signals to output a filtered and auto-nulled signal; and
a synchronous demodulator to receive said filtered and auto-nulled signal from said receiver amp filter.

51. The interrogator of claim 50 wherein said receiver further comprises:
a rectifier to rectify the output of said synchronous demodulator; and
an adder to receive a rectified signal from said rectifier and output a signal.

52. A field effect detector/interrogator to detect a variations in an electro magnetic field comprising:
an antenna driver;

a first antenna;

a second antenna; and a splitter circuit communicatively coupled to said antenna driver such that said splitter splits a drive current signal generated by said antenna driver into a substantially similar first and second antenna drive signals directed to said first and second antennas respectively; and a difference current detector communicatively coupled to said splitter to measure any differential currents imposed on the first and second antennas and to obtain a signal derived from a field differential between the first antenna as compared to the second antenna wherein the difference current detector is a differential transformer.

53. A field effect detector/interrogator to detect a variations in an electro magnetic field comprising:

an antenna driver;

a first antenna;

a second antenna; and a splitter circuit communicatively coupled to said antenna driver such that said splitter splits a drive current signal generated by said antenna driver into a substantially similar first and second antenna drive signals directed to said first and second antennas respectively; and a difference current detector communicatively coupled to said splitter to measure any differential currents imposed on the first and second antennas where the difference current detector further includes a receive having an auto-nulling circuit to null any offset between current in the first antenna and the second antenna.

54. A field effect detector/interrogator to detect a variations in an electro magnetic field comprising:

an antenna driver;

a first antenna;

a second antenna; and a splitter circuit communicatively coupled to said antenna driver such that said splitter splits a drive current signal generated by said antenna driver into a substantially similar first and second antenna drive signals directed to said first and second antennas respectively; and a difference current detector communicatively coupled to said splitter to measure any differential currents imposed on the first and second antennas;

wherein said antenna driver further comprises;

a power supply;

coil driver switches;

a power level adjust circuit;

an impedance matching network; and an auto-tune circuit.

55. The field effect detector/interrogator of claim 54, wherein said auto tune circuit further comprises:

a plurality of trim capacitors; and a phase detector to compare an antenna coil signal to the drive signal to generate a phase error signal to control the switching of said trim capacitors.

* * * * *